United States Patent [19]

Lee et al.

[11] Patent Number: 5,355,429
[45] Date of Patent: Oct. 11, 1994

[54] OPTICAL FIBER STRAIN RELIEF APPARATUS

[75] Inventors: Nicholas A. Lee, Woodbury; Gordon D. Henson, Lake Elmo, both of Minn.

[73] Assignee: Minnesota Mining and Manufacturing Company, St. Paul, Minn.

[21] Appl. No.: 998,446

[22] Filed: Dec. 30, 1992

[51] Int. Cl.$^5$ ............................................. G02B 6/44
[52] U.S. Cl. ..................................... 385/136; 385/76; 385/86; 385/134
[58] Field of Search ............ 385/76, 77, 86, 87, 385/134, 136, 137, 138, 139, 147, 115; 250/227.11, 227.24, 227.25

[56] References Cited

U.S. PATENT DOCUMENTS

| | | | |
|---|---|---|---|
| 3,723,722 | 3/1973 | Van Iderstine et al. | 385/115 X |
| 4,221,962 | 9/1980 | Black et al. | 250/227.25 |
| 4,589,727 | 5/1986 | Williams | 385/136 |
| 4,904,046 | 2/1990 | Paschke et al. | 385/138 |
| 4,957,576 | 9/1990 | Fischer et al. | 385/139 X |
| 5,029,977 | 7/1991 | Wheeler et al. | 385/137 X |
| 5,151,962 | 9/1992 | Walker et al. | 385/86 |

Primary Examiner—John D. Lee
Attorney, Agent, or Firm—Gary L. Griswold; Walter N. Kirn; Stephen W. Buckingham

[57] ABSTRACT

A strain relief apparatus for use with at least one optical fiber mounted between plies within a matrix of a generally planar laminated composite structure wherein the fiber extends from a surface of the composite structure. The apparatus has an anchor that has a distal portion, a proximal portion and an orifice extending therethrough, wherein the proximal portion is configured to be embedded within the composite structure with the distal portion extending from the composite structure and the optical fiber extending through the orifice. In one embodiment, protective cabling is adapted to be threaded over the optical fiber and the protective cabling is secured to the distal anchor portion to provide strain relief to the optical fiber. In another embodiment, a ferrule is adopted to extend over the optical fiber and is mounted within the distal anchor portion to protect the optical fiber. In another embodiment, the anchor is designed such that the orifice increases in size to form a bend radius that provides strain relief to the fiber.

21 Claims, 5 Drawing Sheets

OPTICAL FIBER STRAIN RELIEF APPARATUS

BACKGROUND OF THE INVENTION

The present invention relates to the field of optical fibers. In particular, the present invention relates to an apparatus that provides strain relief for that portion of an optical fiber that is exterior to a surface of a composite structure.

Composite materials, such as graphite/epoxy laminates are rapidly replacing metal and other conventional materials in the manufacture of traditional structures. Normally, such materials are comprised of a variety of layers or plies of a fiber bonded together by a resin or polymer. Such composite structures are extremely strong and lightweight and therefore provide a good strength to weight ratio. Accordingly, these composite structures have gained wide acceptance in many industries, most notably the aircraft industry.

One disadvantage of a composite structure is that when subjected to reoccurring stress, the composite tends to fail catastrophically and in an unpredictable manner. Accordingly, there have been a number of methods and devices that have been utilized to measure the distributed strain in a composite structure.

Most of these techniques incorporate a network of optical fibers embedded between plies within a matrix of a composite structure. The stress which is placed on these fibers causes relative changes in the index of refraction of the fiber which in turn causes a change in the fiber's transmission impedance. In addition, stress placed on the fiber will cause the fiber to back-scatter a portion of optical energy introduced into the fiber. Therefore, an analysis of the composite structure can be performed by launching an optical energy pulse from an optical source, such as a laser, into the optical fibers within the matrix and toward an optical receiver. Alternatively, a reflective surface may be placed at the end of the fiber so that the optical pulse is reflected back to an optical source/receiver. The strain placed on the optical fiber and/or the possible discontinuities within the fiber can then be determined by measuring the elapsed time from the launching of the optical pulse to the reception of the optical pulse. In addition, an analysis of the back-scattering of the optical energy can also be performed.

Optical fiber sensing technology can be used to develop strain and deformation maps of the composite structure by continually monitoring and recording the ability of the optical fibers to transmit optical energy. Similarly, continuous optical monitoring will also detect sudden impacts to the composite structure along with micro-cracks within the structure. Accordingly, the optical fiber systems can be used to generate information on the composite structure throughout its manufacture, installation, maintenance, and use.

A basic concern arises, however, at the point where the optical fiber exits the composite structure. During the manufacture, maintenance, and installation of a composite structure, the fiber may be subjected to a variety of bending forces. An optical fiber can withstand a certain amount of bending, however, such a fiber cannot withstand extreme bending or shearing forces developed at the point of its exit from the composite structure. Therefore, the optical fiber can easily be damaged at points adjacent its exit from the composite structure during the manufacture, installation and maintenance of the composite structure.

A number of references have disclosed a system whereby optical fibers are embedded into a composite material so that the optical fibers may be used in conjunction with a variety of optical devices to monitor the integrity of the composite structure. For example, Lymer et al. U.S. Pat. No. 4,936,649 discloses a damage evaluation system and method using optical fibers embedded within a composite panel. An input bundle of optical fibers is connected to a light source and an output bundle of fibers is connected to an output connector. However, there is no discussion with respect to providing strain relief to the optical fibers as they exit the optical panel.

Similarly, Spillman Jr. U.S. Pat. No. 4,983,034 discloses an optical frequency domain distributed strain sensor for determining the strain distribution along an optical fiber. An optical fiber is embedded within a strain producing structure and is attached to the sensing fiber circuit by a connector. No details are given as to providing strain relief to the fiber as it exits the strain-producing structure.

Therefore, there is a need for an apparatus that provides strain relief for an optical fiber mounted between plies within the matrix of a generally planar laminated composite structure, wherein the fiber extends from a surface of the composite structure.

SUMMARY OF THE INVENTION

The present invention is a strain relief apparatus for use with at least one optical fiber which is mounted between plies within a matrix of a generally planar laminated composite structure wherein the fiber extends from a surface of the composite structure. The apparatus has an anchor that has a distal portion, a proximal portion and an orifice extending therethrough. The proximal portion is configured to be embedded within the composite structure with the distal portion extending from the composite structure and the optical fiber extending through the orifice.

In one embodiment, protective cabling is adapted to be threaded over the optical fiber. The protective cabling is secured to the distal anchor portion by a coupling means so that the protective cabling provides strain relief to the optical fiber thereby reducing the likelihood of fiber damage when forces are applied to the apparatus.

In another embodiment, a ferrule has a proximal portion and a distal portion adjacent a point at which the optical fiber terminates. The proximal ferrule portion is mounted within the distal anchor portion, so that the ferrule provides structural support to the optical fiber, thereby reducing the likelihood of fiber damage when forces are applied to the apparatus.

In another embodiment, the anchor is designed such that the orifice increases in size from a first proximal cross-sectional area to a second, larger distal cross-sectional area to form a bend radius. The bend radius provides strain relief to the optical fiber as it exits from the surface of the structure, thereby reducing the likelihood of fiber damage when the fiber is subjected to bending forces.

In one preferred embodiment, the distal portion and the proximal portion of the anchor are positioned so that the optical fiber is extending in a first direction through the proximal portion and a second direction through the distal portion.

DETAILED DESCRIPTION OF THE PREFERRED EMBODIMENTS

Figure 1:
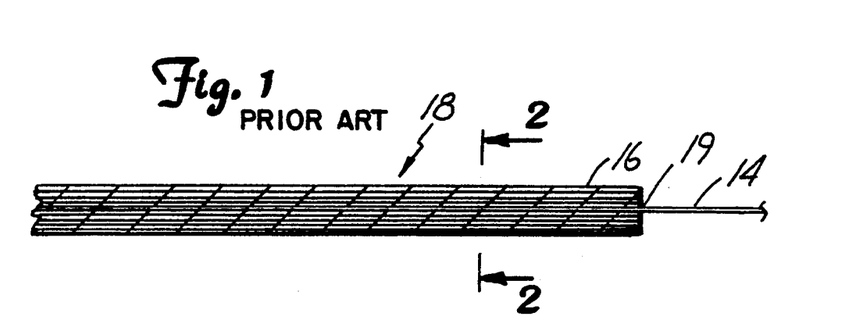
FIG. 1 is a prior art sectional view of an optical fiber exiting a composite structure.
Figure 2:
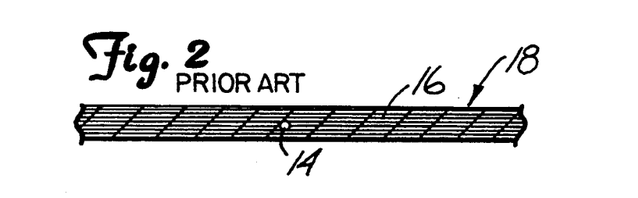
FIG. 2 is a prior art sectional view as taken generally along lines 2—2 of FIG. 1.

Prior art FIGS. 1-2 show an optical fiber 14 embedded between plies 16 within a laminated composite structure 18. As seen in FIG. 1, the optical fiber 14 exits directly from the structure 18 at exit point 19. Hence, the optical fiber 14 is vulnerable to damage, breakage, and over-bending at points adjacent to the exit point 19.

Figure 3:
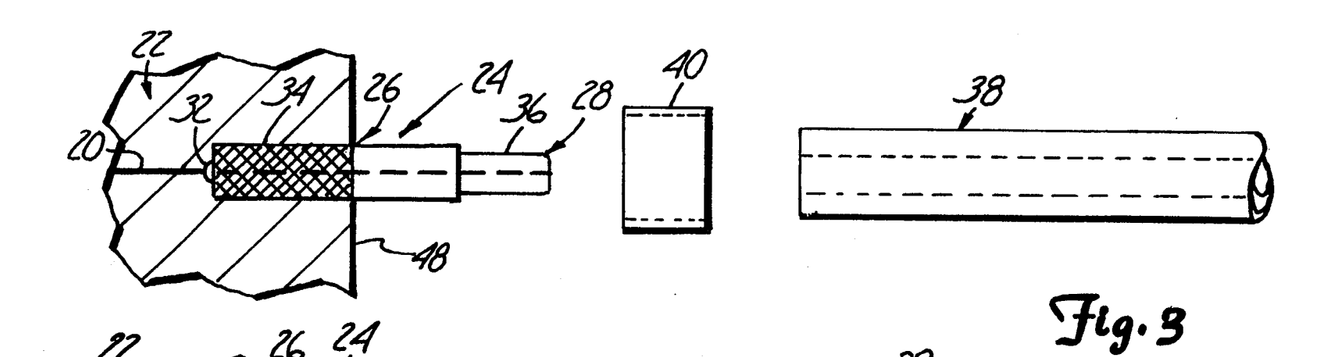
FIG. 3 is an exploded side elevation view of a strain relief apparatus in accordance with the present invention in which a portion of a composite structure has been cut away.
Figure 4:
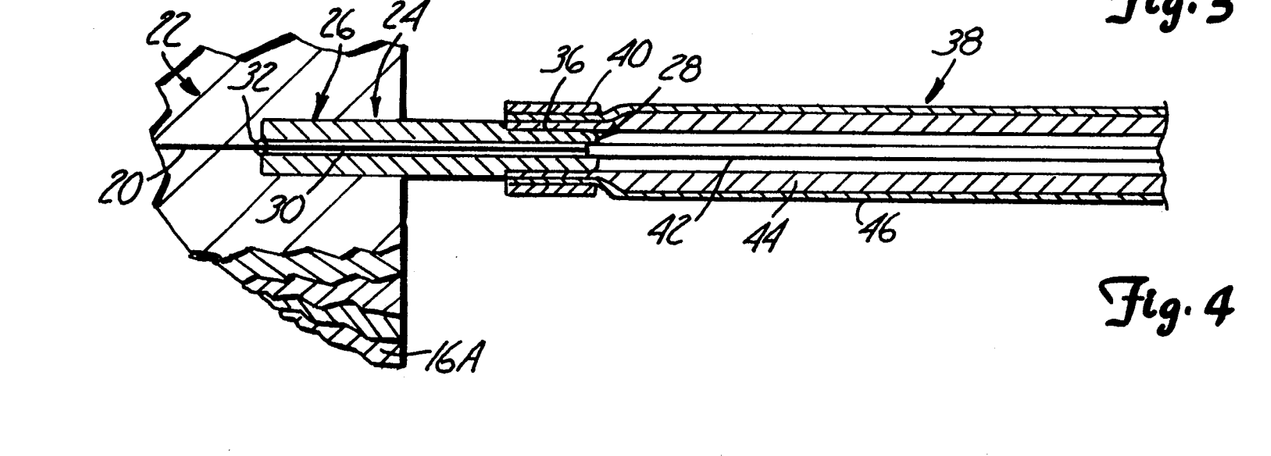
FIG. 4 is an assembled top sectional view of the embodiment of the strain relief apparatus presented in FIG. 3 in which a portion of the composite structure is broken away and shown in layered sections to show a portion of the plies within the composite structure.

FIGS. 3 and 4 show one preferred embodiment of the strain relief apparatus of the present invention. FIG. 3 shows an optical fiber 20 embedded within a laminated composite structure 22. The optical fiber 20 exits the composite structure 22 via an anchor 24. The anchor 24 has a proximal portion 26 that is embedded within the composite structure 22, and a generally cylindrical distal portion 28 which extends from the composite structure 22. Preferably, the proximal portion 26 will be sufficiently small to reduce the effect that the proximal portion 26 has upon the structural integrity of the composite structure 22. The optical fiber 20 is threaded through an orifice 30 (See FIG. 4) that extends throughout the anchor 24. An epoxy plug 32 is disposed at a proximal end of the orifice 30 to provide a fluid tight seal to the orifice 30. The epoxy plug prevents resins from contaminating the optical fiber 20 within the anchor 24 during the laminating process. The proximal portion 26 has a knurled exterior surface 34. The knurled exterior surface 34 assists in rigidly locking the anchor 24 in place within the laminate composite structure 22 during the lamination process. In addition, a cable mounting surface 36 is disposed on the distal portion 28.

As seen in FIG. 4, protective cabling 38 is threaded onto the optical fiber 20 and is secured to the cable mounting surface 36 by a coupling means such as a metal crimp ring 40. The protective cabling 38 has a buffer sleeve 42, a fibrous layer of material 44 such as KEVLAR TM (a registered trademark owned by E. I. DuPont De Nemours, a Delaware corporation), and a cable jacket 46. The buffer 42 is adapted to extend over the optical fiber 20 and into the distal portion 28 of the anchor 24. The fibrous layer 44 and the cable jacket 46 encompass the buffer sleeve 42 and extend around the distal portion 28 of the anchor 24. The fibrous layer 44 and the cable jacket 46 are coupled to the cable mounting surface 36 by the crimp ring 40. The combination of the anchor 24 and the protective cabling 38 provides strain relief to the optical fiber 20 by absorbing the bending forces that would normally be transmitted directly to the optical fiber 20. In addition, a strain relief boot (not shown) may be placed over a portion of the protective cabling 38 and the crimp ring 40 to provide further strain relief.

The following describes how the anchor 24 is installed within the laminate composite structure. During the fabrication process, the optical fiber 22 is placed between laminate sheets or plies 16A that will form the composite structure 22. The laminate sheets are impregnated with resins that will melt to form a fluid when the sheets are subjected to heat and pressure. The optical fiber 20 is threaded through the orifice 30 of the anchor 24. The protective cabling 38 is threaded over the optical fiber 20. A conventional crimping tool such as a crimping pliers is then used to compress the crimp ring 40 to secure the protective cabling 38 to the distal anchor portion 28. The proximal anchor portion 26 is then placed between the plies 16A of the composite structure 22. A portion of each of the plies 16A adjacent the proximal anchor portion 26 is removed in order to obtain a uniform outer surface on the composite structure 22. The amount of material removed from each of the plies 16A is dependent upon its location with respect to the proximal anchor portion 26. The amount of fabric removed is such that the plies 16A engage with the knurled exterior surface 34 during the lamination process to secure the proximal anchor portion 26 within the composite structure 22.

The anchor 24 and the plies 16A are subjected to the following lamination process after the anchor 24 is properly positioned within the plies 16A. First, the plies 16A, along with the anchor 24, are placed in a vacuum container. A vacuum pressure is introduced to the vacuum container to compress the plies 16A and the anchor 24 together. The vacuum container is then placed in a high pressure furnace to heat the resins impregnated within the plies. The heat and pressure puts the resins in a fluid flow state. The epoxy plug 32 and the protective cabling 38 prevent the resins from contaminating the portion of the optical fiber 20 that extends from the composite structure 22. The elevated temperature and pressure cures the resins so that the plies 16A will bond together to form the composite structure 22. The composite structure 22 is removed from the vacuum container after the heat and pressure are evacuated from the container.

Figure 5:
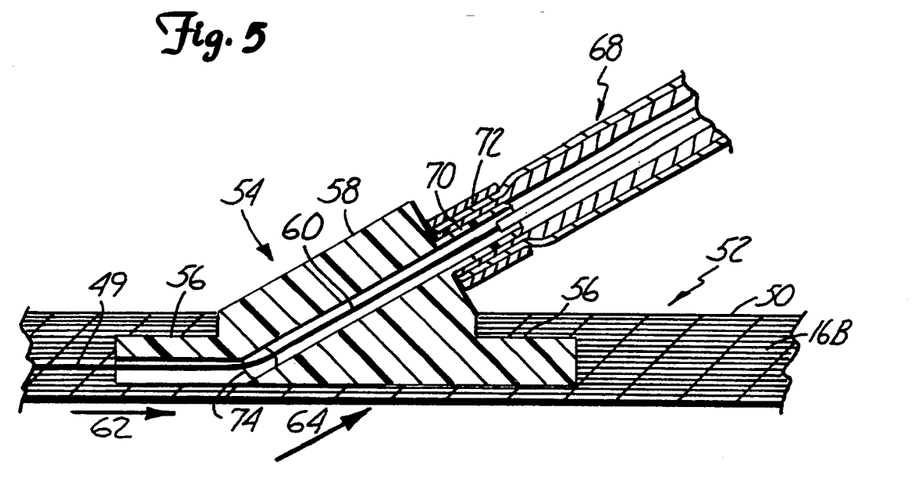
FIG. 5 is a sectional view of an alternative embodiment of a strain relief apparatus in accordance with the present invention.
Figure 6:
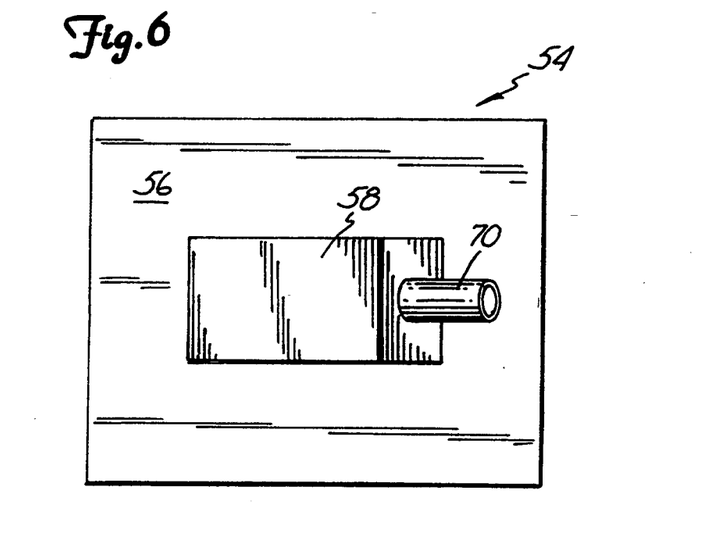
FIG. 6 is a top plan view of the alternative embodiment of the strain relief apparatus shown in FIG. 5.

FIGS. 3 and 4 show an embodiment which provides for the exit of an optical fiber 20 from an edge surface 48. FIGS. 5 and 6 show a variation of the above preferred embodiment in which an optical fiber 49 exits a top surface 50 of a laminate composite structure 52. An anchor 54 has a proximal portion 56, a distal portion 58 and an orifice 60 extending therethrough. The proximal portion 56 and the distal portion 58 of the anchor 54 are positioned so that the optical fiber 49 extends in a first direction through the proximal portion 56 as indicated by arrow 62 and a second direction through the distal portion 58 as indicated by arrow 64. Protective cabling 68 is secured to a cable mounting surface 70 on the distal portion 58 by a crimp ring 72. A conventional crimping tool such as a crimping pliers is used to compress the crimp ring 72. The combination of the anchor 54 and the protective cabling 68 provides strain relief to the optical fiber 20 by absorbing the bending forces that would normally be transmitted directly to the optical fiber. As discussed with the previous embodiment, a strain relief boot can be placed over the protective cabling 68 and the crimp ring 72 to provide further strain relief.

FIG. 6 shows a top view of the embodiment shown in FIG. 5. As seen in FIG. 6, the proximal portion 56 has a generally rectangular shape. Although the shape of the proximal portion 56 is not critical, the proximal portion 56 must have enough surface area to ensure that the anchor 54 is rigidly locked into the composite structure 50. However, the proximal portion 56 should not be too large because a large proximal portion 56 may affect the structural integrity of the composite structure 50.

The embodiment presented in FIGS. 5 and 6 is installed in a manner similar to that of FIGS. 3 and 4. The optical fiber 49 is threaded through the orifice 60 and the proximal anchor portion 56 is placed on top of one of the plies 16B within the composite structure. An epoxy plug 74 is disposed within the orifice 60 to prevent resins from contaminating the optical fiber 49 during the lamination process. Sections corresponding to the shape and dimensions of the proximal portion 56 are removed from a number of plies as they are placed over and around the anchor 54 to obtain a uniform top surface 50 of the composite structure 52. The ply/anchor assembly is then placed in a vacuum container so that the assembly can be laminated.

Figures 7, 8, 9:
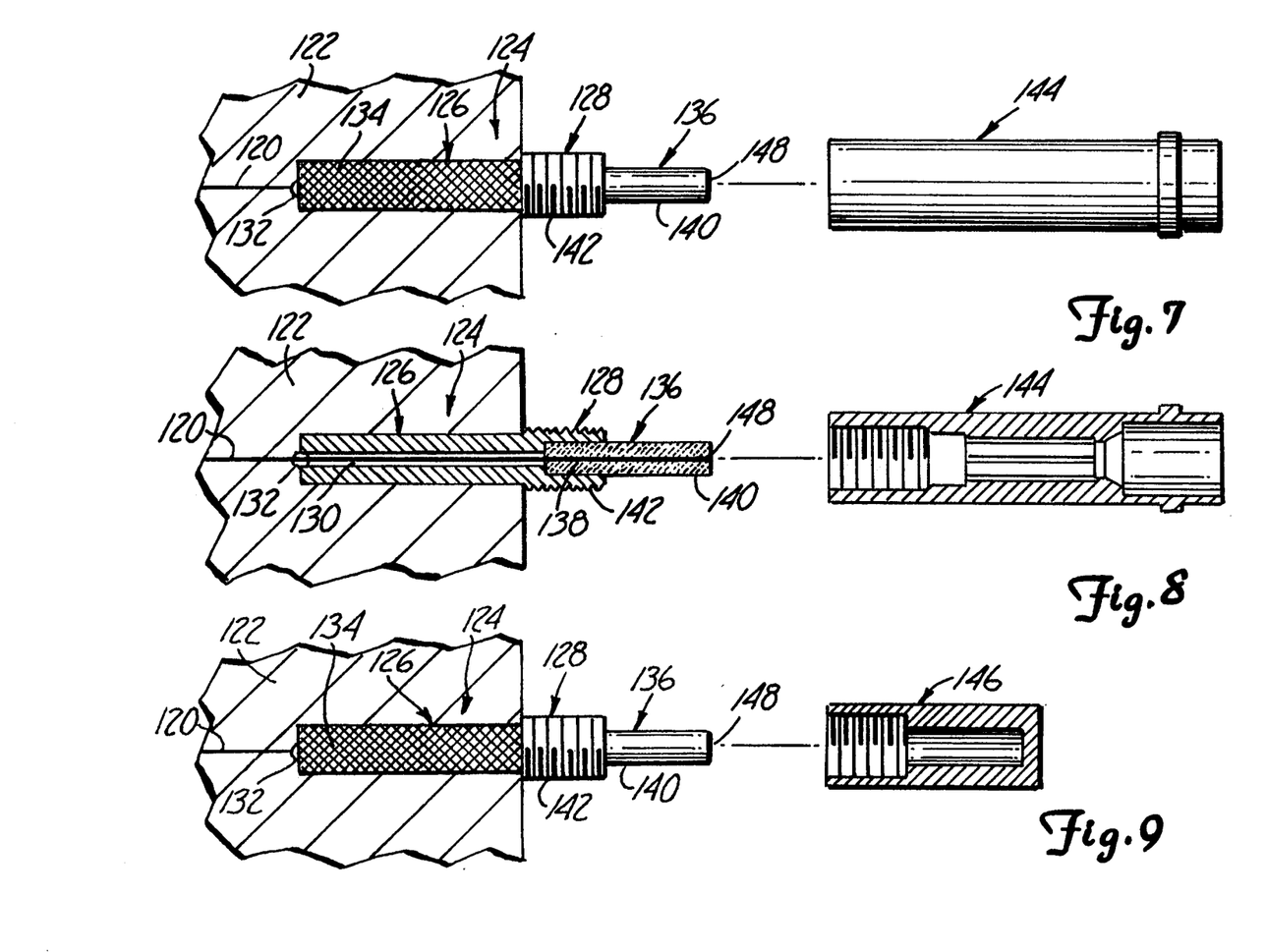
FIG. 7 is an exploded side elevational view of a further alternative embodiment of a strain relief apparatus in accordance with the present invention in which a portion of a composite structure has been cut away.
FIG. 8 is a side sectional view of the further alternative embodiment presented in FIG. 7.
FIG. 9 is a side elevational view of a still further alternative embodiment of the strain relief apparatus in accordance with the present invention in which a portion of a composite structure has been cut away.

FIGS. 7-9 show another embodiment of the present invention. FIG. 7 shows an optical fiber 120 exiting a laminated composite structure 122 via an anchor 124. The anchor has a proximal portion 126, a distal portion 128 and an orifice 130 extending therethrough. The proximal portion 126 has a knurled exterior surface 134. The knurled exterior surface 134 aids in rigidly locking the anchor 124 within the laminated composite structure 122. An epoxy plug 132 is located at the proximal entrance of the orifice 130 to provide a fluid-tight seal to the orifice 130.

A ceramic ferrule 136 has a proximal ferrule portion 138 mounted within the distal anchor portion 128. The optical fiber 120 terminates within a distal portion 140 of the ferrule 136. The combination of the anchor 124 and the ferrule 136 provides strain relief to the optical fiber 120 by absorbing the bending forces that would normally be transmitted to the optical fiber. The structural support and strain relief provided by the anchor 124 and the ferrule 136 greatly reduces the likelihood of unintentional fiber damage or breakage during the production, testing, installation and maintenance of the composite structure 122.

The distal anchor portion 128 has threads 142 for threadably engaging a standard connector adapter 144. The optical fiber 120 can be optically coupled with a variety of optical receivers or sources when the connector adapter 144 is engaged with the anchor 124 and the ferrule 136. The threads 142 also permit threadable engagement with an end cap 146. The end cap 146 is used to protect the ceramic ferrule 136 and the optical fiber 120 from contamination and mechanical damage when the anchor 124 is installed within the laminate composite structure 122.

The following describes how the anchor 124 is installed within the laminate composite structure 122. Prior to the installation, the optical fiber 120 is threaded through the anchor 124 and terminated within the ceramic ferrule 136. The fiber 120 is then polished at a distal end 148 of the ferrule 136. The end cap 146 is then placed over the ceramic ferrule 136 and screwed onto the distal anchor portion 128. The epoxy plug 132 is provided at the proximal end of the orifice 130 to prevent resins from entering the orifice during the lamination process. The proximal anchor portion 126 is then placed between plies within the matrix. As mentioned before, a portion of each the plies is removed to obtain a uniform surface on the composite structure 122. The ply/anchor assembly is then placed in a vacuum container so that the assembly can be laminated.

Once the laminate cures, the end cap 146 is removed and the connector adapter 144 is inserted onto the distal anchor portion 128 and the ceramic ferrule 136. As installed, the anchor 124 and the ceramic ferrule 136 provide structural support and protection to the optical fiber 120 to prevent damage or breakage to the fiber during the maintenance, testing, or installation, of composite structure 122. The anchor/ferrule assembly also provides a means of easily coupling the optical fiber 120 with a variety of optical sources or receivers.

Figure 10:
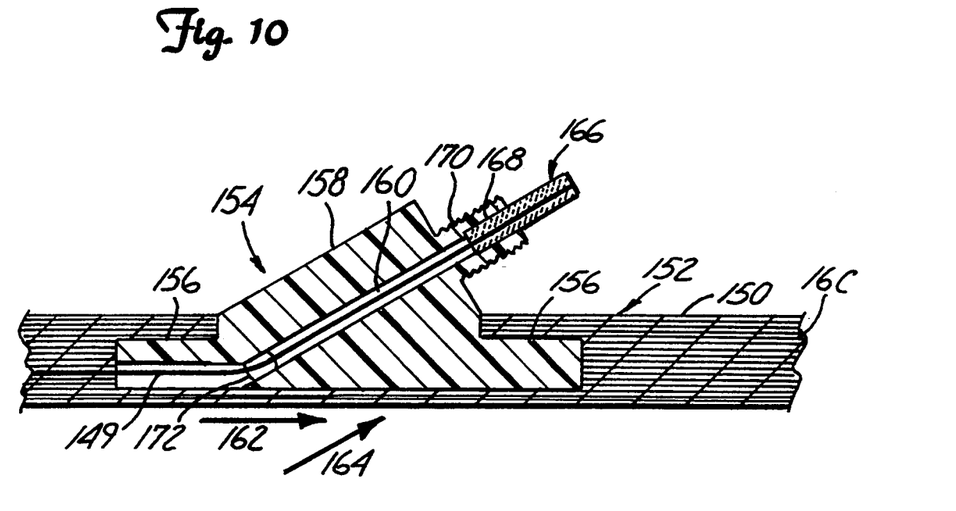
FIG. 10 shows a sectional view of another further alternative embodiment of the strain relief apparatus in accordance with the present invention.
Figure 11:
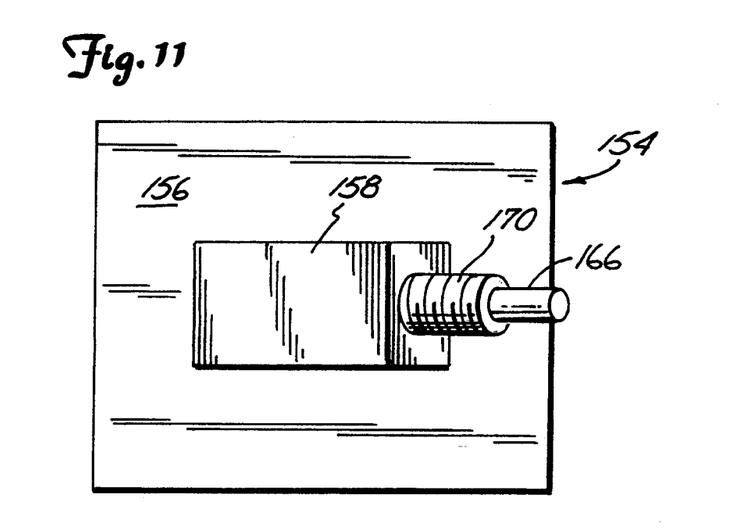
FIG. 11 shows a top plan view of the alternative embodiment shown in FIG. 10.

FIGS. 10 and 11 show a variation of the embodiment presented in FIGS. 7-9. The embodiment in FIGS. 10 and 11 is also similar to the embodiment shown in FIGS. 5 and 6. As seen in FIG. 10, an optical fiber 149 exits a top surface 150 of a laminate composite structure 152 via an anchor 154. The anchor has a proximal portion 156, a distal portion 158 and an orifice 160 extending therethrough. The proximal portion and the distal portion are positioned so that the optical fiber 149 extends in a first direction through the proximal portion 156 as indicated by arrow 162 and a second direction through the distal portion 158 as indicated by arrow 164.

Similar to the previous embodiment described in FIGS. 7-9, the optical fiber 149 extends into and terminates within a ceramic ferrule 166. The ceramic ferrule has a proximal portion 168 mounted within the distal anchor portion 158. The combination of the anchor 154 and the ceramic ferrule 166 provides strain relief to the optical fiber 120 by absorbing the bending forces that would normally be transmitted directly to the optical fiber. The structural support and strain relief provided by the anchor 154 and the ferrule 166 greatly reduces the likelihood of unintentional fiber damage or breakage during the production, testing, installation and maintenance of the composite structure 152. Threads 170 are disposed on the distal anchor portion to allow for the threadable engagement of either an end cap 146 or a standard adapter 144 (as seen in FIGS. 7-9).

The embodiment present in FIGS. 10 and 11 is installed in a manner that is very similar to that presented in FIGS. 5 and 6. The end cap 146 is placed over the ceramic ferrule 166 and attached to the anchor 154 after the optical fiber 149 has been threaded through the anchor 154 and terminated within the ferrule 166. An epoxy plug 172 is disposed within the orifice 160 to prevent resins from contaminating the optical fiber 149 within the orifice 160 during the lamination process. The proximal anchor portion 156 is then placed on top of one of the plies 16C within the composite structure 152. Sections corresponding to the shape of the proximal portion 156 are removed from a number of plies to obtain a uniform top surface 150 of the composite structure 152. The ply/anchor assembly is then placed in a vacuum container so that the assembly can be laminated. The end cap 146 is removed after the lamination process and the standard adaptor 144 is attached to the anchor 154 to provide a means to easily couple the optical fiber 149 with a variety of optical sources or receivers.

As seen in FIG. 11, the proximal portion 156 has a generally rectangular shape. Although the shape of the proximal portion 156 is not critical, the proximal portion 156 must have enough surface area to ensure that the anchor 154 is rigidly locked within the laminate composite structure 152. However, as mentioned before, the proximal anchor portion 156 should not be so large as to effect the structural integrity of the composite structure 152.

Figure 12:
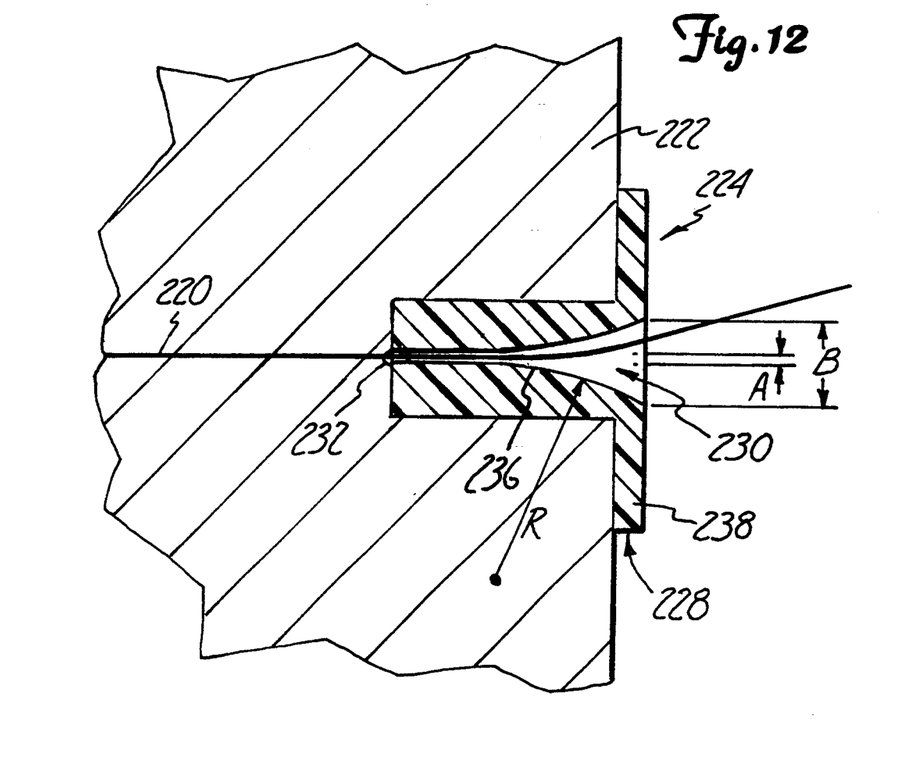
FIG. 12 is a sectional view of another still further alternative embodiment of the strain relief apparatus in accordance with the present invention.

FIG. 12 shows an alternative embodiment of the present invention. An optical fiber 220 embedded within a laminated composite structure 222 exits the composite structure 222 via an anchor 224. The anchor has a proximal portion 226, a distal portion 228 and an orifice 230. The orifice 230 increases in size from a first proximal diameter A to a second larger distal diameter B to form a bend radius R. The bend radius R provides strain relief to the optical fiber 220 as it exits the composite structure 222. An epoxy plug 232 is provided at the proximal entrance of the orifice to provide a fluid-tight seal to the orifice. In addition, the proximal portion 226 has a knurled exterior surface to promote securing the anchor 224 within the composite structure 222.

The present invention provides strain relief to an optical fiber as it exits a laminated composite structure. Accordingly, the present invention increases the ability to use optical fibers in a variety of composite structures. In addition, the present invention allows for easier manufacturing, installation and maintenance of the composite structure.

Although the present invention has been described with reference to preferred embodiments, workers skilled in the art will recognize that changes may be made in form and detail without departing from the spirit and scope of the invention. Particularly, one skilled in the art will recognize that the embodiment presented can be adapted to protect an optical fiber as it exits a non-laminate composite structure (i.e. cement structure). In addition, one skilled in the art will recognize that the embodiments presented can be adapted to protect a plurality of optical fibers exiting a composite structure. For example, the embodiments could be adapted so that a plurality of fibers can be threaded through an orifice of the embodiment. Similarly, a plurality of orifices can be provided in each embodiment to accommodate a plurality of optical fibers.

What is claimed is:

1. A strain relief and cable attachment apparatus for use with at least one optical fiber mounted between plies within a matrix of a generally planar laminated composite structure wherein protective cabling is threaded over the fiber as the fiber extends from the surface of the composite structure, the apparatus comprising:

an anchor having a distal portion, a proximal portion and an orifice extending therethrough, wherein the proximal portion is configured to be embedded within the composite structure, the optical fiber extends through the orifice, and the distal portion extends from the composite structure and is configured so that the protective cabling can be secured to the distal anchor portion to thereby provide strain relief to the optical fiber and reduce the likelihood of fiber damage when forces are applied to the apparatus.

2. A strain relief apparatus for use with at least one optical fiber mounted within a generally planar composite structure wherein the optical fiber extends from a surface of the composite structure, the apparatus comprising:

an anchor section having a proximal portion, a distal portion, and an orifice extending therethrough, wherein the proximal portion is adapted to be embedded within the composite structure, with the distal portion extending outwardly from the composite structure and the optical fiber extending through the orifice;

protective cabling adapted to extend over the optical fiber; and coupling means for securing the protective cabling to the distal anchor portion so that the protective cabling provides strain relief to the optical fiber thereby reducing the likelihood of fiber damage when forces are applied to the apparatus.

3. The apparatus of claim 2 wherein the distal portion and the proximal portion of the anchor are positioned so that the optical fiber is extending in a first direction through the proximal portion and a second direction through the distal portion.

4. The apparatus of claim 2 wherein the proximal portion of the anchor has a knurled exterior surface.

5. The apparatus of claim 2 further comprising means for providing a fluid-tight seal at a proximal entrance of the orifice.

6. A strain relief apparatus for use with at least one optical fiber mounted between plies within a matrix of a generally planar laminated composite structure wherein the fiber extends from a surface of the composite structure, the apparatus comprising:

an anchor having a distal portion, a proximal portion and an orifice extending therethrough, wherein the proximal portion is configured to be embedded within the composite structure, with the distal portion extending from the composite structure and the optical fiber extending through the orifice;

protective cabling adapted to be threaded over the optical fiber; and coupling means for securing the protective cabling to the distal anchor portion so that the protective cabling provides strain relief to the optical fiber thereby reducing the likelihood of fiber damage when forces are applied to the apparatus.

7. The apparatus of claim 6 wherein the protective cabling has a buffer, a fibrous layer encompassing a portion of the buffer, and a jacket encompassing the fibrous layer, such that the buffer is adapted to extend over the fiber and into the distal portion of the anchor with the fibrous layer and the jacket extending over the distal portion of the anchor.

8. The apparatus of claim 6 wherein a sleeve element extends about the protective cabling and is crimped to thereby secure the protective cabling to the distal anchor portion.

9. The apparatus of claim 6 wherein the distal portion and proximal portion of the anchor are positioned so that the optical fiber is extending in a first direction through the proximal portion and a second direction through the distal portion.

10. The apparatus of claim 6 wherein the proximal portion of the anchor has a knurled exterior surface.

11. The apparatus of claim 6 further comprising means for providing a fluid-tight seal at a proximal entrance of the orifice so that resins used to bond the plies during the construction of the composite structure will not enter the orifice.

12. A strain relief and structural support apparatus for use with at least one optical fiber mounted between plies within a matrix of a generally planar, laminated composite structure wherein the fiber extends from a surface of the composite structure, the apparatus comprising:
 an anchor having a distal portion, a proximal portion and an orifice extending therethrough, wherein the proximal portion is configured to be embedded within the composite structure, with the distal portion extending from the composite structure and the optical fiber extending through the orifice;
 a ferrule having a distal portion adjacent a point at which the optical fiber terminates and a proximal portion, wherein the proximal ferrule portion is mounted within the distal anchor portion so that the ferrule, provides structural support to the optical fiber thereby reducing the likelihood of fiber damage when forces are applied to the apparatus and
 means for providing a fluid-tight seal at a proximal entrance of the orifice so that resins used to bond the plies during the construction of the composite structure will not enter the orifice.

13. The apparatus of claim 12 further comprising a connector adaptor that extends over the ferrule and is engaged with the proximal anchor portion, the connector adapter being configured to optically couple the optical fiber with a connector assembly to thereby provide optical communication with an optical apparatus.

14. The apparatus of claim 12 wherein the distal portion and proximal portion of the anchor are positioned so that the optical fiber is extending in a first direction through the proximal portion and a second direction through the distal portion.

15. The apparatus of claim 12 wherein the proximal portion of the anchor has a knurled exterior surface.

16. The apparatus of claim 12 further comprising a cap extending over the ferrule, the cap engaging with the distal anchor portion to provide a fluid-tight seal therebetween so that resins used to bond the plies during the construction of the composite structure will not destroy the integrity of the ferrule.

17. A strain relief apparatus for use with at least one optical fiber mounted between plies within a matrix of a generally planar, laminated composite structure wherein the fiber extends from a surface of the composite structure, the apparatus comprising:
 an anchor section having a distal portion, a proximal portion and an orifice extending therethrough, wherein the proximal portion is configured to be embedded within the composite structure, with the distal portion extending distally from the surface of the composite structure, and the optical fiber extending through the orifice, wherein the orifice increases in size from a first proximal cross-sectional area to a second, larger distal cross-sectional area to form a bend radius that provides strain relief to the optical fiber as it exits from the surface of the structure thereby reducing the likelihood of fiber damage when the fiber is subjected to bending forces.

18. The apparatus of claim 17 further comprising means for providing a fluid-tight seal to a proximal entrance of the orifice so that resins used to bond the plies during the construction of the composite structure will not enter the orifice.

19. The apparatus of claim 18 wherein the means for providing a fluid-tight seal is an epoxy plug.

20. The apparatus of claim 17 wherein the proximal portion of the anchor has a knurled exterior surface.

21. A strain relief apparatus for use with at least one optical fiber mounted between plies within a matrix of a generally planar, laminated composite structure wherein the fiber extends from a surface of the composite structure, the apparatus comprising:
 an anchor having a proximal portion, a distal portion and an orifice extending therethrough, wherein the proximal portion is configured to be embedded within the composite structure, with the distal portion extending outwardly from the composite structure and the optical fiber extending through the orifice;
 protective cabling, the protective cabling having a buffer, a threaded sleeve encompassing a portion of the buffer and a jacket encompassing the sleeve, such that the buffer is adapted to extend over the fiber and into the distal portion of the anchor with the threaded sleeve and the jacket extending over the distal portion of the anchor; and
 a sleeve element extends about the protective cabling and is crimped to thereby secure the protective cabling to the distal anchor portion to provide strain relief to the optical fiber, thereby reducing the likelihood of fiber damage when forces are applied to the apparatus.

* * * * *